3,133,050
WATER-SOLUBLE REACTIVE DYES OF THE
PHTHALOCYANINE SERIES
Hans von Tobel, Riehen, Switzerland, assignor to
Sandoz Ltd., Basel, Switzerland
No Drawing. Filed Mar. 8, 1963, Ser. No. 263,705
Claims priority, application Switzerland Mar. 9, 1962
10 Claims. (Cl. 260—146)

This invention relates to water-soluble reactive dyes of the phthalocyanine series which have the formula

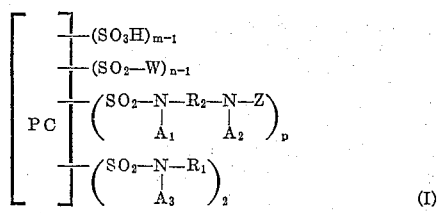

(I)

wherein PC represents a phthalocyanine radical,
$A_1$ represents a hydrogen atom or a substituted or unsubstituted hydrocarbon radical,
$A_2$ represents a hydrogen atom or a substituted or unsubstituted hydrocarbon radical,
$A_3$ represents a hydrogen atom or a substituted or unsubstituted hydrocarbon radical,
$R_1$ represents the radical of an azo dye,
$R_2$ represents a substituted or unsubstituted divalent aliphatic, aromatic, cycloaliphatic or araliphatic radical or together with $A_1$, $A_2$ and the two N's a divalent heterocyclic radical,
W represents an amino group which may be mono- or di-substituted, and
Z represents a reactive substituent, i.e. a radical capable of forming a chemical linkage with the substrate, and wherein $m$, $n$, $p$ and $q$ each has a value of at least 1 but not more than 3 and the sum of $m+n+p+q$ is at least 4 but not more than 6 and wherein the dye of Formula I contains the number of water-solubilizing groups necessary for water-solubility.

A series of especially interesting dyes of the Formula I comprises those in which PC represents a copper-phthalocyanine radical, $A_1$, $A_2$ and $A_3$ each represents a hydrogen atom or one of $A_1$, $A_2$ and $A_3$ represents an optionally substituted, e.g. by —OH, alkyl radical with 1 to 5 carbon atoms and the two others represent hydrogen atoms, $R_1$ represents the radical of a water-soluble monoazo dye of the benzene-azo-benzene or of the benzene-azo-5-pyrazolone series, $R_2$ represents the 1,3- or 1,4-phenylene radical which may bear a sulfonic acid group or a 1,2-ethylene, 1,2- or 1,3-propylene radical, Z represents a halogenoalkanoyl or halogenoalkenoyl radical with 2 to 3 carbon atoms, a 2,4-dichloro-1,3,5-triazinyl-6-radical, a 2-amino- or 2-substituted amino-4-chloro-1,3,5-triazinyl-2-radical, the substituent being alkyl or hydroxyalkyl with 1 to 3 carbon atoms or mono- or disulfophenyl, a 2,6- or -4.6-dichloro- or 2,5,6- or 4,5,6-trichloropyrimidyl radical or a 2,4-dichloro-6-hydrogen- or -6-methylpyrimidyl-5-methylene radical, W represents an amino group and the sum of $m$, $n$, $p$ and $q$ is 5 or 6 and the whole molecule contains 4 to 6 sulfonic acid groups which may be partially replaced by sulfonic acid amide or carboxylic acid groups.

The process for the production of these dyes comprises reacting simultaneously or in any desired order, 1 mole of the chloride of a phthalocyanine-di-, or -tri- or -tetra-sulfonic acid or a mixture of such chlorides, with at least 1 mole of an aminoazo dye whose amino group may be monosubstituted by a hydrocarbon radical, with at least 1 mole of a diamine of the formula

(II)

wherein $A_1$, $A_2$ and $R_2$ have the aforecited meanings and X represents hydrogen, a substituted or unsubstituted acyl radical or a reactive substituent, and, according to the final dye desired, with water and/or ammonia and/or a primary or secondary amine and condensing the reaction products without further processing when X stands for hydrogen, or after cleavage of the acyl radical when X stands for this radical, with at least 1 mole of a compound which is condensible with a primary or secondary amino group and is capable of forming a chemical linkage with the substrate, the starting products being so chosen that the final dye contains the number of water-solubilizing groups necessary for water-solubility.

Examples of suitable water-solubilizing groups are the sulfonic acid, carboxylic acid, methylsulfonyl, ethylsulfonyl and sulfonamide groups, of which the last-named may be monosubstituted preferably by low-molecular (i.e. with 1 to 5 carbon atoms) hydrocarbon radicals. It is advantageous for the dyes of Formula I to contain at least two sulfonic acid groups in order to possess the water-solubility necessary for use in practice, but it is hardly possible to introduce more than eight sulfonic acid groups into the dye molecule.

Therefore the dyes of Formula I contain preferably four to six sulfonic acid groups which may in part be replaced by carboxylic acid, alkylsulfonyl or sulfonamide groups, which latter may be monosubstituted. It is to be noted that the water-solubilizing effect of the carboxylic acid group and the unsubstituted or monosubstituted sulfonamide group is dependent on the pH value. At room temperature only the alkali metal salts of these groups show really good effectiveness, the acid forms being much less effective.

Other weakly to very weakly water-solubilizing groups such as hydroxyl, acetylamino, carbomethoxyamino, carbethoxyamino and disubstituted sulfonamide groups are of only secondary importance.

The chlorides of phthalocyanine-di-, -tri- or -tetra-sulfonic acids and their mixtures which are used as starting products are derived from metal-free phthalocyanine or from metal-containing phthalocyanine, e.g. cobalt, nickel or preferably copper phthalocyanine. They bear the sulfonic acid chloride groups in the positions 3 of the benzene nuclei when they are produced by direct sulfochlorination or in the position 4 when they are produced from the corresponding sulfonic acids.

The aminoazo dyes upon which the radical $R_1$ is based are preferably water-soluble mono- or dis-azo dyes, e.g. 4-amino-1,1'-azobenzene-2'-, -3'- or -4'-mono-sulfonic acid or -2',4'- or -2',5'-disulfonic acid, 4-amino-4'-methyl-, -4'-methoxy-, -4'-ethoxy- or -4'-chloro-1,1'-azobenzene-2'-sulfonic acid, 2-(4'-amino-phenylazo) - naphthalene - 3,6-, -4,8-, -5,7- or -6.8-disulfonic acid or -3,6,8- or -4,6,8-trisulfonic acid, 4-amino-2,2'-dimethyl-1,1'-azobenzene-4'-sulfonic acid, 1-(4'-aminonaphthyl-1'-azo)-benzene-2,4- or -2,5- or -4,6'- or -4,7'-disulfonic acid, 1-phenyl-3-methyl-4-(3"- or 4"-aminophenylazo)-5-pyrazolone-2'-, -3'- or -4'-sulfonic acid or -2',4'- or -2',5'-disulfonic acid, 1-(2',5'-dichlorophenyl)- or 1-(2'-chlorophenyl)- or 1-(2'-methylphenyl- or 1-(2'-chloro-6'-methylphenyl)-3-methyl-4-(3''- or -4''-aminophenylazo)-5-pyrazolone-4'-sulfonic acid, 1-(3'-amino- or 1-(4'-aminophenyl)-3-methyl-4-phenylazo-5-pyrazolone-2''-, -3''- or -4''-sulfonic acid or -2'',4''- or -2',5''-disulfonic acid, 3-keto-2-(3'- or 4'-amino-phenylazo)-butyric acid-phenylamide-2''-, -3''- or -4''-sulfonic acid, 1-hydroxy-2-phenylazo-6- or -7-amino- or -6- or -7-methylaminonaphthalene-3,2'-, -3,3'- or -3,4'-disulfonic acid, 2-[4'-(4''-aminophenylazo)-phenylazo]-naphthalene-3,6-, -4,8-, -5,8- or -6,8-disulfonic acid or -3,6,8- or -4,6,8-trisulfonic acid, 4-(4''-aminophenylazo)-1,1'-azobenzene-3,4'-disulfonic acid, 1-hydroxy-2-(3'- or 4'-amino-phenylazo)-naphthalene-4,6-, -4,7'- or 4,6'-disulfonic acid, or -4,6,6'- or -4,7,6'-trisulfonic acid, 1-(3'- or 4'-amino-phenylazo)-2-hydroxynaphthalene-4,6'-, -6,6'- or -3,6-disulfonic acid or -3,6,6'-, -3,7,6'- or 3,8,6'-trisulfonic acid, 1-hydroxy-2-(3'- or 4'-aminophenylazo)-6- or 7-acylaminonaphthalene-3,6'-disulfonic acid, 1-hydroxy-2-(3'- or 4'-amino-phenylazo)-8-acylamino-naphthalene-3,5- or -3,6-disulfonic acid, or -3,5,6'- or -3,6,6'-trisulfonic acid, the acyl group being e.g. acetyl, propionyl, benzoyl, carbethoxy or carbomethoxy. Aminoazo compounds insoluble in water or moderately to poorly soluble in water can also be used, e.g. 4-amino-1,1'-azobenzene, 4-amino-4'-methyl-, -4'-methoxy-, -4'-ethoxy- or -4'-chloro-1,1'-azobenzene, 4-amino-1,1'-azobenzene-3'- or -4'-sulfonic acid amide, 4-amino-1,1'-azobenzene-2'- or -4'-carboxylic acid, 1-(3'- or 4'-aminophenyl)-3-methyl-4-phenylazo-5-pyrazolone, 1-(3'- or 4'-aminophenyl)-3-methyl-4-phenylazo-5-pyrazolone-2''- or -4''-carboxylic acid-3''- or -4''-sulfonic acid amide, 1-(3'- or 4'-aminophenyl-3-carboxy-4-phenylazo-5-pyrazolone, 3-keto-2-(3'- or4'-aminophenylazo)-butyric acid phenylamide-2''- or -4''-carboxylic acid or -3''- or -4''-sulfonic acid amide. The sulfonic acid amide group can of course be replaced by its mono- or disubstituted derivatives. When the aminoazo compound used is insoluble, moderately soluble or poorly soluble in water, it is necessary to ensure that the radical of the dye molecule contains the number of water-solubilizing groups necessary for water-solubility. The radical $R_2$ is preferably an aliphatic radical e.g. an alkylene radical, such as —$CH_2$—$CH_2$—, —$CH_2$—$CH_2$—$CH_2$—,

—CH$_2$—CH—
　　　|
　　　CH$_3$

—$CH_2$—$CH_2$—$CH_2$—$CH_2$—, or an aromatic radical e.g. a phenylene radical which may be substituted such as

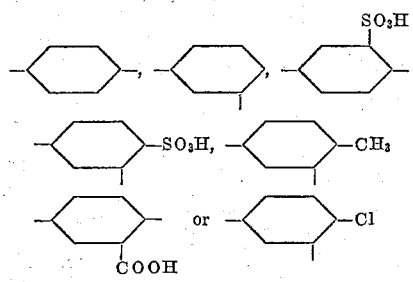

or a cycloaliphatic radical, e.g. a cyclo-hexylene radical such as

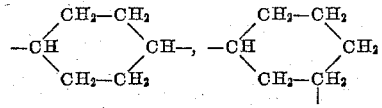

etc.

The substituents $A_1$, $A_2$ and $A_3$ represent preferably hydrogen atoms or low-molecular (i.e. containing 1 to about 5 carbon atoms) alkyl, e.g. methyl, ethyl, hydroxyalkyl, e.g. 2-hydroxyethyl, 2- or 3-hydroxypropyl, alkoxyalkyl, e.g. 2-ethoxyethyl, 3-methoxypropyl, 3- or 4-methoxy-butyl, halogenoalkyl, e.g. 2-chloroethyl, or benzyl radicals. When the radical $R_2$ is aromatic or cycloaliphatic, it is advisable to choose hydrogen atoms or aliphatic radicals as $A_1$ and/or $A_2$. But if the radical $R_2$ is aliphatic, $A_1$ and $A_2$ may be hydrogen atoms or aliphatic or araliphatic radicals such as aromatic or cycloaliphatic radicals.

The radical W is preferably the amino group, a low molecular mono- or dialkylamino group, e.g. methylamino, dimethylamino, ethylamino, diethylamino, a low molecular mono- or di-(hydroxyalkyl)-amino group, e.g. 2-hydroxyethylamino, di-(2-hydroxyethyl)-amino, 2- or 3-hydroxypropylamino, 3-hydroxybutylamino, a low molecular alkoxyalkylamino group e.g. 2-ethoxyethylamino, 3-methoxypropylamino, 3- or 4-methoxybutylamino, a low molecular carboxy- or sulfoalkylamino group and its N-methyl and N-ethyl-derivatives, carboxymethylamino, 2-carboxyethylamino, N-methyl-N-carboxymethylamino, 2-sulfoethylamino, N-methyl-N-2-sulfoethylamino, N-ethyl-N-2-sulfoethylamino, a mono- or dinuclear arylamino group which may contain 1 to 2 carboxy or 1 to 3 sulfonic acid groups, e.g. phenylamino, 2- or 4-methylphenylamino, 3- or 4-chlorophenylamino, 4-acetylaminophenylamino, 2- or 4-carboxyphenylamino, or 2,5-dicarboxyphenylamino, 3- or 4-sulfophenylamino, 2,4- or 2,5-disulfophenylamino, 4,8- or 5,7- or 6,8-disulfonaphthyl-2-amino, 4,6,8-trisulfonaphthyl-2-amino.

For the reactive component upon which the reactive group Z is based choice is made of compounds which are condensible with a primary or secondary amino group and also are capable of forming a chemical linkage with the substrate, i.e. those which contain a readily cleavable substituent and/or an unsaturated radical whose multiple linkage is easily capable of addition. Examples of suitable components are functional derivatives of low molecular halogeno alkanoic acids such as chloroacetic acid, bromoacetic acid, β-chloro- and β-bromo-propionic acid, α,β-dichloro- and α,β-dibromo-propionic acid; low molecular alkanoic acids such as acrylic acid, methacrylic acid; low molecular halogenoalkenoic acids such as α-chloro- and α-bromoacrylic acid, β- and γ-chloro- or bromo-crotonic acid, α,β- and β,β-dichloro- or dibromo-acrylic acid, and the following heterocyclic compounds: tetrameric chloro- or bromo-cyan, cyanuric chloride, cyanuric bromide, primary condensation products of a cyanuric halide of the formula

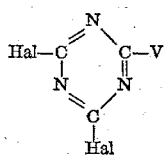

(IV)

wherein Hal represents chlorine or bromine and V represents the radical, which may be further substituted, of a primary or secondary aliphatic, alicyclic, aromatic or heterocyclic amine, of an aliphatic, alicyclic, aromatic or heterocyclic hydroxy or thiol compound, in particular the radical of aniline, its alkyl, sulfonic acid or carboxylic acid derivatives, of low mono- and di-alkylamines, and of ammonia;

further, 2,4,6 - trichloropyrimidine and 2,4,6 - tribromopyrimidine and their derivatives which may contain in the 5-position, for example, any of the following substituents: methyl, ethyl, carboxy, carboxylic acid methyl- or -ethyl ester, alkenyl, e.g. allyl, chlorovinyl, substituted alkyl, e.g. carboxymethyl, chloro- or bromomethyl; 2,4,5,6 - tetrachloro- or -tetrabromopyrimidine, 5 - bromo - 2,4,6 - trichloropyrimidine, 2,6 - dichloro- or -dibromopyrimidine-4 - carboxylic acid ethyl- or -methyl - ester, 2,4,5 - trichloropyrimidine, 2,4,5 - tribromopyrimidine, 2,6 - dichloro- or -dibromopyrimidine, 2,4 - dichloro - 5 - chloromethyl - 6 - methylpyrimididne, 2,4 - dibromo - 5 - bromomethyl - 6 - methylpyrimidine, 2,4 - dichloro - 5 - chloromethylpyrimidine, 2,4 - dibromo - 5 - bromomethylpyrimidine, 2,5,6 - trichloro - 4 - methylpyrimidine, 2,5,6 - tribromo - 4 - methylpyrimidine and 2,6 - dichloro - 4 - trichloro-methylpyrimidine.

Examples of suitable diamines containing at least one aromatically bound amino group are: diaminonaphthalenes such as 1,5 - diaminonaphthalene, 1,4 - diamino - 2-methylnaphthalene, 1,4 - diaminonaphthalene - 6 - sulfonic acid; diaminodiphenyls such as 4,4' - diamino - 1,1' - diphenyl, 4,4' - diamino - 2,2' - dimethyl- or -2,2' - dimethoxy- or -2,2'-dichloro-1,1'-diphenyl or -1,1'diphenyl-5-sulfonic acid, 4,4'-diamino-1,1'-diphenyl-2,2'-disulfonic acid, 4,4' - diamino - diphenylmethane, 4,4' - diamino-stilbene - 2,2' - disulfonic acid, 1 - aminomethyl - 3- or -4 - aminobenzene and preferably diaminobenzenes such as 1,3- or 1,4 - diaminobenzene, 1,3- or 1,4 - diamino - 6-methyl-, -6 - methoxy- or -6 - chlorobenzene, 1,3- or 1,4-diaminobenzene - 6 - sulfonic acid or -6 - carboxylic acid; 1 - amino - 3- or -4 - methylaminobenzene, 1 - amino - 3- or -4 - methylaminobenzene - 6 - sulfonic acid.

The following may be enumerated as examples of suitable amines of Formula II: N - acetylethylene - diamine, N - acetyl - 1,2- or -1,3 - propylenediamine, N - acetyl-1,2- or -2,3- or -1,3- or -1,4 - butylenediamine, N-acetyl-N' - methyl- or -N' - ethyl- or -N' - β - hydroxyethyl-ethylenediamine, N - acetyl - N - methylethylenediamine, N - acetyl - N - methyl - 1,2- or -1,3 - propylenediamine, 1 - acetylamino - 3- or -4 - aminobenzene, 1 - acetylamino-3- or -4 - methylamino- or -ethylamino- or -β - hydroxy-ethylaminobenzene, 1 - acetylamino - 3- or -4 - amino- or -methylamino - 6 - methyl- or -6 - methoxy- or -6 - chlorobenzene, 1 - amino- or 1 - methylamino - 3- or -4 - acetyl-amino - 6 - methyl- or -6 - methoxy- or 6 - chlorobenzene, 1 - acetylamine - 3- or -4 - aminobenzene - 6 - sulfonic acid or -6 - carboxylic acid, 1 - acetylamino - 3- or -4 - methyl-amino- or -ethylamine- or -β - hydroxyethylaminobenzene--6 - sulfonic acid or -6 - carboxylic acid, 1 - N - methyl-N - acetylamino - 3- or -4 -aminobenzene, 1 - N - methyl-N - acetylamino - 3- or -4 - methylaminobenzene, 1-acetyl-amino - 3- or -4 - aminomethylbenzene, 1 - acetylamino-methyl - 3- or -4 - aminobenzene, 4-acetylamino - 4' - amino - 1,1' - diphenyl, 4 - acetylamino - 4' - amino - 2,2' - dimethyl- or -2,2' - dimethoxy- or -2,2' - dichloro - 1,1'-diphenyl, 4 - acetylamino - 4' - amino - 1,1' - diphenyl-2,2' - disulfonic acid, 4 - acetylamino - 4' - aminodiphenyl-methane, 1 - amino - 3- or -4 - nitrobenzene, 1 - amino-4 - methyl - 3 - nitrobenzene. In the above-mentioned compounds of Formula II the acetyl radical may be replaced by another acyl radical such as propionyl, butyryl, benzoyl, oxalyl, carbomethoxy or carbethoxy.

The reaction of the chlorides of a phthalocyanine-di-, -tri- or -tetra-sulfonic acid with the aminoazo dye and the diamine of Formula II according to the first mode of operation of the process is carried out in organic solution or suspension, e.g. in an inert organic solvent, in aqueous-organic or preferably in aqueous solution or suspension. It is advisable to work at low temperature, e.g. at 0 to 10° C., or at room temperature or at a higher temperature, in a weakly acid, neutral or weakly alkaline medium, e.g. in the pH region 6 to 9, in the presence of acid-binding agents.

Any sulfonic acid chloride groups which may be present after the condensation reaction with the aminoazo dye and the diamine of Formula II are saponified to sulfonic acid groups or reacted with ammonia or a primary or secondary amine. When the substituent X of the diamine is an acyl group, this group is split off, e.g. by heating with a dilute mineral acid, preferably 4–10% hydrochloric or sulfuric acid, at 70–100° C.

As a rule the simplest way of introducing the acid radicals is to use the corresponding acid halides, or in some instances the acid anhydrides. It is best to work at low temperatures, e.g. 0–20° C., and in the presence of an acid-binding agent such as sodium carbonate, sodium hydroxide, calcium hydroxide or sodium acetate at a weakly acid, neutral or weakly alkaline reaction, e.g. in the pH region 4 to 9. For acylation, the carboxylic acid chlorides are employed as such or in solution in two to five times their amount of benzene, chlorobenzene, methyl-benzene, dimethylbenzene or acetone, and are added drop-wise to the aqueous, well buffered solution of the compound containing the amino group, e.g. at a temperature of 2–5° C. Acylation with the anhydrides can be effected in the same way.

The introduction of a dihalogenocyanuric radical is best accomplished in aqueous medium at about 0° C. and at a weakly acid reaction, e.g. at pH values between 3 and 5. The cyanuric halide can be used as such in solid form or in solution in an organic solvent, e.g. acetone. For the primary condensation products of a cyanuric halide of the Formula IV it is best to choose a temperature of 30–60° C. and a pH value of 4–6, while for the di-, tri- or tetra-halogenopyrimidines temperatures of 40° to 100° C. are the most suitable. If temperatures higher than about 50° C. are necessary it is advisable to work in vessels equipped with reflux condensers in view of the volatility in water vapor of certain halogenopyrimidines. The reaction can be conducted in a weakly acid, neutral to weakly alkaline medium, preferably in the pH region of 3 to 9. To maintain a constant pH value an acid-binding agent, e.g. sodium acetate or a phosphate buffer, is added to the mixture at the start of the reaction, or small portions of sodium or potassium carbonate or bicarbonate in solid, pulverized form or as an aqueous solution are added during the reaction. Aqueous solutions of sodium or potassium hydroxide are also suitable as neutralizing agents. The addition of small amounts of a wetting or emulsifying agent to the reaction mixture can accelerate the rate of reaction.

The reaction with the halogenated heterocyclic compounds is so conducted that only one halogen atom reacts with one exchangeable hydrogen atom of the amino group. For this purpose about one mole of the halogenated heterocyclic compound is employed for each amino group. The phthalocyanine dyes obtained, which contain at least one reactive group, are precipitated from their aqueous solutions by the addition of salt, filtered off, washed if necessary and dried.

The condensation of the phthalocyanine-di-, -tri- or -tetra-sulfonic acid chloride with the amine of Formula II and the diamine containing at least one aromatically bound amino group according to the second mode of operation of the process is carried out in organic solution or suspension, e.g. in an inert organic solvent, in aqueous-organic or preferably in aqueous solution or suspension. It is advantageous to work at low temperatures, e.g. 0–10° C., or at room temperature or at a higher temperature, in a weakly acid, neutral or weakly alkaline medium, e.g. in the pH region 6–9, in the presence of an acid-binding agent. When the unreacted diamine contains one aliphatic and one aromatic amino group, the latter is protected from reacting, e.g. by acylation, so that only the aliphatic amino group reacts with a sulfonic acid chloride group. The aromatic amino group is of course freed again after the reaction.

Any sulfonic acid chloride groups that are present after the condensation reaction with the amine of Formula II and the diamine containing at least one aromatically bound amino group are saponified to sulfonic acid groups or reacted with ammonia or a primary or secondary amine.

The reaction product is precipitated with salt or acid, filtered off with suction, washed if necessary and dried. The moist paste or the dried product is dissolved or suspended in water and directly or indirectly diazotized at low temperature, e.g. −5° to +20° C., or preferably at 0° to +5° C. The reaction product can be diazotized immediately after condensation without isolation. But it must be remembered that isolation is at the same time a very effective means of purification and that in the condensation undesirable by-products can be formed and/or unreacted starting products left after the reaction, so that isolation is to be recommended as the safest procedure.

Depending on the coupling components, the coupling reaction is carried out in an acid, neutral or alkaline medium at temperatures of e.g. —5° to 40° C. Amines which couple in ortho or para position to an amino group which may be mono- or di-substituted with alkyl, aryl, cycloalkyl or aralkyl radicals are coupled in an acid to neutral medium, e.g. in the pH region of 1.0 to 7.0, and at temperatures below about 40° C., e.g. at 0° to 30° C. They are dissolved in water, in a dilute acid solution or in a mixture of water or of a dilute acid solution and an organic solvent, e.g. alcohol, acetone, dioxane, dimethylformamide etc. or finely dispersed, if necessary with the aid of a dispersing or emulsifying agent. It is convenient to begin the coupling reaction in a distinctly acid medium and to gradually neutralize the acid by the addition of sodium or potassium acetate, carbonate or bicarbonate. With the coupling components containing a phenolic or enolic hydroxyl group it is advisable to work in a weakly acid, neutral to alkaline medium, e.g. in the pH region of 3 to 12, at low temperature, e.g. —5° to 25° C., or preferably 0° to 15° C.

When the substituent X in Formula II represents a reactive group, the product is the final dye and it can be isolated in the usual way. When X stands for an acylamino group, this group is hydrolyzed, e.g. by heating with a dilute mineral acid, preferably 4–10% hydrochloric or sulfuric acid, at 70–100° C. When Y represents a nitro group, this group is reduced, e.g. by heating with sodium sulfide or sodium hydrogen sulfide solution in the alkaline pH region at temperatures of 40° to 60° C., or preferably at 40–50° C.

The new reactive dyes of the phthalocyanine series which contain four or more water-solubilizing groups, preferably sulfonic acid groups, possess good solubility in water, good stability in printing pastes and padding liquors, good compatibility with salts and hard water and good reactivity with vegetable, animal and synthetic polyamide fibers. They are not sensitive to the ions of heavy metals such as copper, iron and chromium, and they reserve acetate, triacetate, polyester, polyacrylonitrile, polyvinyl chloride, polyvinyl acetate and polyalkylene fibers. Owing to their only moderate substantivity, the unfixed portion of dye is easy to wash off from dyeing and prints on cellulosic fibers.

The reactive dyes of the invention which contain two or three water-solubilizing groups, preferably sulfonic acid groups, are well suitable for the exhaustion dyeing of cellulosic fibers and for the acid dyeing of wool, silk and synthetic polyamide fibers.

The new reactive dyes are suitable for dyeing leather, for dyeing, padding and printing fibers of animal origin, e.g. wool, silk; synthetic polyamide fibers, e.g. nylon; cellulosic fibers, e.g. cotton, linen; fibers of regenerated cellulose, e.g. viscose staple fiber, viscose and cuprammonium rayon; and mixtures and other articles of these fibers. The optimum conditions of application vary with the nature of the fiber and the dyes used. Animal fibers and synthetic polyamide fibers are dyed, printed or fixed preferably in acid, neutral or weakly alkaline medium, e.g. in the presence of acetic acid, formic acid, sulfuric acid, ammonium sulfate, sodium metaphosphate, etc. Dyeing can also be carried out in the presence of levelling agents, e.g. polyoxyethylated fatty amines or mixtures of the same and alkylpolyglycol ethers, in an acetic acid to neutral bath which is adjusted to a neutral or weakly alkaline reaction at the end of dyeing by the addition of small amounts of an agent of alkaline reaction, e.g. ammonia, sodium carbonate or bicarbonate, or of compounds which react alkaline on heating, e.g. hexamethylene-tetramine or urea. The goods are thoroughly rinsed and if necessary acidified with some acetic acid.

The dyeings obtained possess good fastness to light and wet agencies, e.g. washing, perspiration, milling, water, sea water and potting, and good fastness to rubbing and dry cleaning (organic solvents).

The dyeing, padding and printing or fixation of the dyes on cellulosic fibers is carried out to best advantage in alkaline medium, e.g. in the presence of sodium carbonate or bicarbonate, sodium hydroxide solution, potassium hydroxide solution, sodium metasilicate, sodium borate, trisodium phosphate, ammonia, etc. To preclude reduction effects it is often of advantage to use a mild oxidizing agent in dyeing, padding or printing, e.g. sodium 3-nitrobenzene-1-sulfonate. The fixation of the dyes on cellulosic fibers is normally effected by heating. A number of the dyes, depending on the reactivity of the reactive groups, can be dyed or fixed at lower temperatures, e.g. 20° to 40° C.

The addition of certain quaternizable amines such as trimethylamine, triethylene-diamine, or of asymmetrical dimethyl-hydrazine, or N-amino-pyrrolidine, preferably in stoichiometric amounts, accelerates the fixation of the dye on the fiber so that the fixing temperature can be lowered and/or the fixation time reduced.

The dyeings and prints on cellulosic fibers are notable for good light fastness, outstanding wet fastness properties (washing, perspiration, water, sea water and alkali) and good rubbing and dry cleaning fastness. These properties are due to the formation of a stable chemical linkage between the dye molecule and the cellulose molecule. Often the total amount of dye applied does not take part in the chemical reaction with the fiber. In such cases the portion of unreacted dye is removed from the fiber by a suitable operation such as rinsing and/or soaping, if necessary at high temperatures. For this purpose synthetic detergents can be used, e.g. alkylarylsulfonates such as sodium dodecylbenzenesulfonate, alkyl sulfates such as sodium lauryl sulfate, alkylpolyglycolethers and mono- or di-alkylphenyl-polyglycol ethers which may be carboxymethylated or sulfated such as sodium lauryl polyglycol ether sulfate.

In the following examples the parts and percentages are by weight and the temperatures in degrees centigrade.

*Example 1*

57.6 parts of copper phthalocyanine are entered into 270 parts of chlorosulfonic acid. The solution is heated to 140° and held at this temperature for 1 hour. The temperature is then allowed to drop to 70–75° and 75 parts of thionyl chloride are slowly added. The mass is stirred for 3 hours at 70–75° and then discharged onto ice. The precipitated sulfonic acid chloride is filtered off, washed with dilute hydrochloric acid, and stirred into a mixture of 300 parts of ice and 700 parts of water. 29 parts of 2-(3'-aminophenylamino)-4,5,6-trichloropyrimidine or 4-(3'-aminophenylamino)-2,5,6-trichloropyrimidine or a mixture of both compounds are added. The pH value is adjusted to 7 with dilute sodium hydroxide solution. Over the next 3 hours the pH value is maintained at 7–8 by the gradual addition of dilute sodium hydroxide solution and the temperature is allowed to increase from 0° to 20°. 35.7 parts of 4-amino-1,1'-azobenzene-2',5'-disulfonic acid and 50 parts of sodium carbonate are added and the reaction mass stirred for 48 hours at room temperature. The dye is precipitated by the addition of hydrochloric acid and filtered off. The filter cake is pasted with water and neutralized with sodium hydroxide solution. The neutral paste is dried at 70° in vacuum.

A mercerized cotton fabric is printed with a paste of the following composition:

50 parts of the dye obtained as described above,
100 parts of urea,
365 parts of water,
450 parts of a 3% sodium alginate thickening,
10 parts of sodium 3-nitrobenzene-1-sulfonate, and
25 parts of sodium carbonate 1000 parts total The print is dried, steamed for 10 minutes at 102–104°, rinsed in cold and warm water, soaped at the boil, rinsed again and dried. A green print having very good light and wet fastness is obtained.

*Example 2*

89.6 parts of copper phthalocyanine-4,4′,4″,4‴-tetrasulfonic acid are entered into 270 parts of chlorosulfonic acid and heated for 1 hour at 120°. The temperature is allowed to drop to 70–75° and 90 parts of thionyl chloride are slowly added. The mass is stirred for 3 hours at 70–75° and then run onto ice. The precipitated sulfonic acid chloride is filtered off, washed with dilute hydrochloric acid and stirred into a mixture of 300 parts of ice and 700 parts of water. 18.8 parts of 1,4-diaminobenzene-2-sulfonic acid and 35.7 parts of 4-amino-1,1′-azobenzene-2′,5′-disulfonic acid are added and the mixture neutralized with sodium hydroxide solution. 80 parts of sodium bicarbonate are added and the mass stirred for 48 hours at a temperature increasing from 0° to 20°. The dye is precipitated by the addition of hydrochloric acid, filtered off and washed with dilute hydrochloric acid. The filter cake is stirred into 1000 parts of water, the pH value adjusted to 7 with sodium hydroxide solution, and the solution heated to 70–85°. 21.2 parts of 2,4-dichloro-5-chloromethyl-6-methylpyrimidine are added and the pH value maintained at 7–8 by the gradual addition of dilute sodium hydroxide solution. As soon as no more alkali is consumed the condensation reaction is completed. The dye is precipitated with common salt, filtered off and dried at 80° in vacuum.

This dye is applied by the following procedure:

3 parts of the dye are dissolved in 100 parts of water, and to the solution are added 10 parts of urea, 30 parts of a 10% sodium carbonate solution and 0.5 part of sodium 3-nitrobenzene-1-sulfonate. A viscose filament fabric is impregnated with this solution, squeezed to retain 75% of its weight of the solution, dried, steamed with wet steam 5–10 minutes at 102°, rinsed, soaped at the boil for 15 minutes, and dried. A green dyeing of very good washing and light fastness is obtained.

*Example 3*

A suspension of sulfochlorinated copper phthalocyanine is prepared as described in Example 1. 15 parts of 1-amino-3-acetylaminobenzene are added and the suspension is neutralized with dilute sodium hydroxide solution. During the next 3 hours the pH value is held at 7 by the gradual addition of dilute sodium hydroxide solution. Then 35.7 parts of 4-amino-1,1′-azobenzene-2′,5′-disulfonic acid and 80 parts of sodium bicarbonate are added and the solution stirred for 48 hours at room temperature. It is then heated to 80–85°, 250 parts of 30% hydrochloric acid are added, and stirring continued for 3 hours at this temperature. The precipitated amino dye is filtered off and washed well with dilute hydrochloric acid. The filter cake is stirred into 600 parts of water, the solution neutralized with sodium hydroxide solution and cooled to 0–5°. 18.4 parts of cyanuric chloride are added. The pH value is maintained at 4–5 by the gradual addition of a solution of sodium carbonate. As soon as no more alkali is consumed the condensation is completed. The dye is precipitated with common salt, filtered off and dried at 40° with vacuum.

When the dichlorotriazinyl dye obtained according to this example is treated for a few hours with a dilute aqueous solution of ammonia at 40–50°, the corresponding monochlorotriazinyl dye is obtained. This is precipitated with sodium chloride, filtered off and dried to give a green powder which dissolves in water with a green coloration. Printed on mercerized cotton with the recipe of Example 1, it gives a green print of very good light and washing fastness.

*Example 4*

To a suspension of sulfochlorinated copper phthalocyanine prepared as given in Example 1 are added 29 parts of a condensation product of 1 mole of 1,3-diaminobenzene and 1 mole of 2,4,5,6-tetrachloropyrimidine and 44.5 parts of the compound:

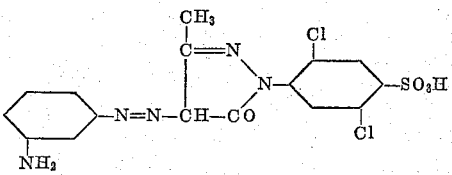

The mixture is neutralized with dilute sodium hydroxide solution. By the gradual addition of sodium hydroxide solution the pH value of the mixture is maintained at 6–7 for the next 5 hours at room temperature and for the following 5 hours at 60–65°. It is then cooled to room temperature. Sodium hydroxide solution is slowly added until a clear solution is formed. This is stirred for 30 minutes, then neutralized with hydrochloric acid, and the dye precipitated with common salt. The precipitate is filtered off, washed with salt solution, and the filter cake dried at 80° in vacuum.

*Example 5*

The moist filter cake of the tetrasulfonic acid chloride obtained from 57.6 parts of copper phthalocyanine according to Example 1 is stirred into a mixture of 300 parts of ice and 500 parts of water. 15 parts of 1-amino-3-acetylaminobenzene and 28 parts of 1,3-diaminobenzene-4-sulfonic acid are added. Dilute sodium hydroxide solution is added dropwise with good stirring until the mixture reacts neutral. 60 parts of sodium bicarbonate are added and stirring continued at room temperature until a clear blue solution is obtained. The intermediate is then precipitated with hydrochloric acid, filtered off and washed well with dilute hydrochloric acid. The filter cake is stirred into a mixture of 800 parts of water and 50 parts of 30% hydrochloric acid at 0°. An aqueous solution of 6.9 parts of sodium nitrite is added dropwise. The suspension is stirred for 1 hour at 0° and then run slowly into a solution of 32.3 parts of 1-(2,5-dichlorophenyl)-3-methyl-5-pyrazolone-4′-sulfonic acid in 300 parts of water, 200 parts of ice and 100 parts of 30% sodium hydroxide solution. The green solution is stirred overnight. To saponify the acetylamino group 300 parts of 30% hydrochloric acid are added and the mass heated for 3 hours at 90°. The precipitated intermediate is filtered off and washed with dilute hydrochloric acid. The filter cake is dissolved neutral with 600 parts of water and sodium hydroxide solution. The solution is heated to 80°, 22 parts of 2,4,5,6-tetrachloropyrimidine are added, and the pH value maintained between 5 and 7 by the gradual addition of dilute sodium hydroxide solution. As soon as no further sodium hydroxide solution is consumed, the condensation is finished. The dye is precipitated with sodium chloride, filtered off and dried at 80° in vacuum. Similar dyes are obtained when in place of 22 parts of 2,4,5,6-tetrachloropyrimidine, 18.5 parts of 2,4,6-trichloropyrimidine or 21.5 parts of 2,4-dichloro-5-chloromethyl-6-methylpyrimidine are used at the same temperature of condensation.

*Example 6*

The moist paste of copper-phthalocyanine -3,3′,3″,3‴-tetrasulfonic acid chloride obtained from 57.6 parts of copper-phthalocyanine according to the details of Example 1 is stirred in 300 parts of ice and 700 parts of water, 18.8 parts of 1,3-diaminobenzene-4-sulfonic acid and 35.7 parts of 4-amino-1,1′-azobenzene-2′,5′-disulfonic acid are added and the mixture neutralized with 30% sodium hydroxide solution. After the addition of 7 parts of 25% ammonia (0.1 mole of $NH_3$) and 60 parts of sodium bicarbonate the mixture is stirred for 30 hours at room temperature and then heated to 60°. The dye is precipitated by the addition of sodium chloride, filtered off and washed with a solution of sodium chloride. The dye paste is dissolved in 1200 parts of water at 50° and 21.2 parts of 2,4-dichloro-5-chloromethyl-6-methylpyrimidine are added. The mixture is heated to 80° and stirred at 80–90° until no free amino group more can be detected. During this time the pH value is held at 6–7 by the addition of a 20% sodium carbonate solution. When the reaction is complete, the dye is precipitated by the addition of sodium chloride, filtered off at about 30°, washed with a sodium chloride solution, dried and ground. A green powder is obtained which dissolves in water with a green coloration and dyes cellulosic fibers according to the dyeing process described in Example 2 in green shades fast to light, washing, water, perspiration and rubbing.

*Example 7*

A solution prepared mutatis mutandis according to the particulars of Example 3 so that it contains 65 parts of the dye of the formula

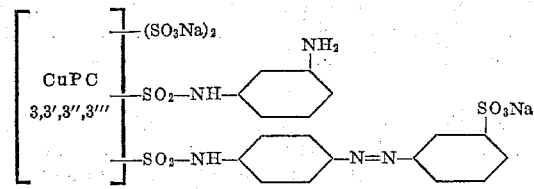

dissolved in 700 parts of water is cooled to 0–5°. 8 parts of chloracetyl chloride are added dropwise at from 0° to 5° with good stirring, and the pH value is maintained between 4 and 6 by simultaneous addition of a 10% sodium carbonate solution. When free amino group can no longer be detected the reaction is completed. The dye is precipitated with sodium chloride, filtered off and dried at 40° with vacuum.

2 parts of the above dye are dissolved in 4000 parts of water at 40°. After the addition of 2 parts of 100% acetic acid, 100 parts of a wool fabric are entered into this bath, which is brought to the boil within from 15 to 20 minutes and maintained at the boil for 45 to 60 minutes. After cooling to 85 to 90°, 3 parts of 25% ammonia or 3 parts of hexamethylene tetramine are added, and the bath is maintained at 90° for 20 minutes. The fabric is removed from the bath, then rinsed thoroughly, acetic acid being added to one of the rinsings, and subsequently dried. A level green dyeing of good fastness to light, washing, milling, perspiration, rubbing and dry cleaning is obtained.

The following table gives details of further phthalocyanine dyes of Formula I which are produced according to the procedure described in the specification, especially in Examples 1 to 7. In the table they are characterized by the phthalocyanine from which PC is derived and the positions of the substituents (column I), the aminoazo dye from which

is derived (column II), the radical $R_2$ (column III), the reactive component from which Z is derived (column IV), the symbols $A_1$, $A_2$, W, m, n, p and q (columns V to XI), and the shade of the dyeing on cotton or wool (column XII).

| Ex. No. | I | II | III | IV | V | VI | VII | VIII | IX | X | XI | XII |
|---|---|---|---|---|---|---|---|---|---|---|---|---|
| 8 | Copperphthalocyanine-3,3',3'',3'''. | 1-phenyl-3-methyl-4-(4''-aminophenylazo)-5-pyrazolone-2,5'-disulfonic acid. | 1,4-phenylene | 2,4,6-trichloropyrimidine. | H | H | | 3 | 1 | 1 | 1 | Green. |
| 9 | do | do | do | 2,4,5,6-tetrachloropyrimidine. | H | CH₃ | | 3 | 1 | 1 | 1 | Do. |
| 10 | do | do | -CH₂-CH₂- | do | H | H | | 3 | 1 | 1 | 1 | Do. |
| 11 | do | 4-amino-1,1'-azobenzene-4'-sulfonic acid. | -CH₂-CH₂- | β-Chloropropionylchloride. | CH₃ | H | | 3 | 1 | 1 | 1 | Do. |
| 12 | do | do | 1,3-phenylene | 2,4,6-trichloro-5-methylpyrimidine. | H | H | | 3 | 1 | 1 | 1 | Do. |
| 13 | do | 4-amino-1,1'-azobenzene-2'-sulfonic acid. | do | 2-(3'-sulfophenylamino)-4,6-dichloro-1,3,5-triazine. | H | H | | 2 | 1 | 1 | 2 | Yellowish green. |
| 14 | Copperphthalocyanine-4,4',4'',4'''. | do | do | do | H | H | | 3 | 1 | 1 | 1 | Green. |
| 15 | do | 1-phenyl-3-methyl-4-(4''-aminophenylazo)-5-pyrazolone-4'-sulfonic acid. | -⬡-SO₃H | 2-methylamino-4,6-dichloro-1,3,5-triazine. | H | H | | 3 | 1 | 1 | 1 | Do. |
| 16 | Copperphthalocyanine 3,3',3'',3'''. | do | -⬡-SO₃H | 2,4,5,6-tetrachloropyrimidine. | H | H | | 3 | 1 | 1 | 1 | Do. |
| 17 | do | 1-phenyl-3-methyl-4-(3''-aminophenylazo)-5-pyrazolone-3',6''-disulfonic acid. | -⬡-SO₃H | do | C₂H₅ | H | | 3 | 1 | 1 | 1 | Do. |
| 18 | do | do | -CH₂-CH₂-CH₂- | Chloroacetyl chloride. | H | H | NH₂ | 2 | 2 | 1 | 1 | Do. |
| 19 | Copperphthalocyanine 4,4',4'',4'''. | 4-amino-1,1'-azobenzene-2',4'-disulfonic acid. | -⬡-SO₃H | 2,4,6-trichloropyrimidine. | H | H | | 3 | 1 | 1 | 1 | Do. |
| 20 | Copperphthalocyanine 3,3',3'',3'''. | do | -⬡-SO₃H | 2-(4'-sulfophenylamino)-4,6-dichloro-1,3,5-triazine. | H | H | | 3 | 1 | 1 | 1 | Do. |

| Ex. No. | I | II | III | IV | V | VI | VII | VIII | IX | X | XI | XII |
|---|---|---|---|---|---|---|---|---|---|---|---|---|
| 21 | Copperphthalocyanine 3,3′,3″,3‴. | 4-amino-1,1′-azobenzene-2′,4′-disulfonic acid. | -CH₂-CH(CH₃)- | β-Chloropropionylchloride. | H | H | | 3 | 1 | 1 | 1 | Do. |
| 22 | ___do___ | ___do___ | 1,3-phenylene | 2-(2′-sulfoethylamino)-4,6-dichloro-1,3,5-triazine. | CH₃ | H | | 3 | 1 | 1 | 1 | Do. |
| 23 | ___do___ | 4-amino-4′-methyl-1,1′-azobenzene-2′-sulfonic acid. | (phenyl with -CH₃) | α-Chloroacrylylchloride. | H | H | | 3 | 1 | 1 | 1 | Do. |
| 24 | ___do___ | ___do___ | -CH₂-CH(CH₃)- | 2-di-(β′-hydroxy-ethyl)-amino-4,6-dichloro-1,3,5-triazine. | H | H | NH₂ | 1 | 3 | 1 | 1 | Do. |
| 25 | ___do___ | ___do___ | 1,4-phenylene | 2-amino-4,6-dibromo-1,3,5-triazine. | H | H | | 3 | 1 | 1 | 1 | Do. |
| 26 | ___do___ | ___do___ | ___do___ | 2,4,6-trichloropyrimidine. | H | H | | 2 | 1 | 1 | 2 | Yellowish green. |
| 27 | ___do___ | ___do___ | (phenyl with -SO₃H) | 2,4,5,6-tetrachloropyrimidine. | H | H | | 2 | 1 | 2 | 1 | Green. |
| 28 | ___do___ | 4-amino-1,1′-azobenzene-2′,5′-disulfonic acid. | (phenyl with -SO₃H) | ___do___ | H | H | | 2 | 1 | 1 | 1 | Do. |
| 29 | ___do___ | ___do___ | -CH₂-CH₂- | Chloroacetylchloride. | H | H | | 2 | 1 | 1 | 1 | Do. |
| 30 | ___do___ | ___do___ | 1,3-phenylene | 2-(2′,5′-disulfophenyl-amino)-4,6-dichloro-1,3,5-triazine. | H | H | | 2 | 1 | 1 | 1 | Do. |
| 31 | ___do___ | ___do___ | (phenyl with SO₃H) | 2,4,5,6-tetrabromopyrimidine. | H | H | | 3 | 1 | 1 | 1 | Do. |
| 32 | ___do___ | ___do___ | (phenyl with SO₃H) | β-Bromopropionyl chloride. | H | H | | 3 | 1 | 1 | 1 | Do. |
| 33 | ___do___ | 4-amino-4′-methoxy-1,1′-azobenzene-2′-sulfonic acid. | (phenyl with SO₃H) | 2-N-methyl-N-2′-sulfoethyl-amino-4,6-dichloro-1,3,5-triazine. | CH₃ | H | | 3 | 1 | 1 | 1 | Do. |
| 34 | ___do___ | ___do___ | (phenyl with SO₃H) | 2,4,6-trichloropyrimidine. | H | H | NH₂ | 2 | 2 | 1 | 1 | Do. |
| 35 | ___do___ | 1-phenyl-3-methyl-4-(3″-aminophenylazo)-5-pyrazolone-4′-sulfonic acid. | (phenyl with COOH) | ___do___ | H | H | | 3 | 1 | 1 | 1 | Do. |
| 36 | ___do___ | ___do___ | (phenyl with -Cl) | 2,4,6-trichloro-5-carboxymethyl-pyrimidine. | H | H | | 3 | 1 | 1 | 1 | Do. |
| 37 | ___do___ | 1-(2′-methylphenyl)-3-methyl-4-(4″-aminophenylazo)-5-pyrazolone-4′,6″-disulfonic acid. | (phenyl with -C₂H₅) | 2,4,5,6-tetrachloropyrimidine. | H | H | | 3 | 1 | 1 | 1 | Do. |
| 38 | ___do___ | 1-(2′-methylphenyl)-3-methyl-4-(4″-aminophenylazo)-5-pyrazolone-4′,6″-disulfonic acid. | 1,3-phenylene | α-Chloroacrylylchloride. | H | H | | 3 | 1 | 1 | 1 | Do. |
| 39 | copperphthalocyanine-4,4′,4″,4‴. | 4-amino-1,1′-azobenzene-2′,5′-disulfonic acid. | (phenyl with -SO₃H) | 2-(2′,4′-disulfophenylamino)-4,6-dichloro-1,3,5-triazine- | H | H | | 3 | 1 | 1 | 1 | Do. |

| Ex. No. | I | II | III | IV | V | VI | VII | VIII | IX | X | XI | XII |
|---|---|---|---|---|---|---|---|---|---|---|---|---|
| 40 | copperphthalocyanine-4,4',4''. | 4-amino-1,1'-azobenzene-2',5'-disulfonic acid. | (phenylene-SO₃H) | β-Chloropropionylchloride. | H | H | | 3 | 1 | 1 | 1 | Do. |
| 41 | copperphthalocyanine-3,3',3'',3'''. | 4-methylamino-4'-methyl-1,1'-azobenzene-2'-sulfonic acid. | (phenylene-SO₃H) | 2-(β-hydroxyethylamino-4,6-dibromo-1,3,5-triazine. | H | H | | 3 | 1 | 1 | 1 | Do. |
| 42 | ......do...... | ......do...... | (phenylene-SO₃H) | chloroacetyl chloride. | H | H | CH₃-NH- | 2 | 2 | 1 | 1 | Do. |
| 43 | ......do...... | 4-amino-4'-methoxy-1,1'-azobenzene-2'-sulfonic acid. | -CH₂-CH₂-CH₂-CH₂- | 2,4,6-trichloro-5-carboxypyrimidine. | H | H | | 3 | 1 | 1 | 1 | Do. |
| 44 | ......do...... | ......do...... | 1,3-phenylene | 2-ethylamino-4,6-dichloro-1,3,5-triazine. | H | CH₃ | | 3 | 1 | 1 | 1 | Do. |
| 45 | Copperphthalocyanine-3,3',3'',3'''. | 4-amino-4'-chloro-1,1'-azobenzene-2'-sulfonic acid. | ......do...... | 2,4-dichloro-5-chloromethyl-6-methyl-pyrimidine. | H | H | | 3 | 1 | 1 | 1 | Do. |
| 46 | ......do...... | 4-amino-2-methyl-1,1'-azobenzene-2',5'-disulfonic acid. | ......do...... | 2-carboxymethylamino-4,6-dichloro-1,3,5-triazine. | H | H | | 3 | 1 | 1 | 1 | Do. |
| 47 | ......do...... | ......do...... | -CH₂-CH₂- | 2,4,6-tribromo-5-methylpyrimidine. | H | H | | 3 | 1 | 1 | 1 | Do. |
| 48 | ......do...... | 4-amino-3-methyl-1,1'-azobenzene-2',5'-disulfonic acid. | 1,3-phenylene | 2,4,6-trichloro-5-bromopyrimidine. | H | H | HO-C₂H₄-NH- | 2 | 2 | 1 | 1 | Do. |
| 49 | Copperphthalocyanine-4,4',4'',4'''. | 4-amino-2,5-dimethyl-1,1-azobenzene-2',5'-disulfonic acid. | ......do...... | Cyanuric chloride. | H | H | | 3 | 1 | 1 | 1 | Do. |
| 50 | ......do...... | ......do...... | ......do...... | 2,4,6-tribromopyrimidine. | H | H | | 3 | 1 | 1 | 1 | Do. |
| 51 | ......do...... | 4-amino-2-methyl-5-methoxy-1,1'-azobenzene-2',5'-disulfonic acid. | (phenylene-SO₃H) | 2,4,6-trichloro-5-chloromethyl-pyrimidine. | H | H | | 3 | 1 | 1 | 1 | Do. |
| 52 | ......do...... | ......do...... | (phenylene-OCH₃) | 2,4,6-trichloro-5-carbomethoxypyrimidine. | H | H | | 3 | 1 | 1 | 1 | Do. |
| 53 | Copperphthalocyanine-3,3',3'',3'''. | ......do...... | (phenylene-COOH) | 2,4,5,6-tetrachloropyrimidine. | H | H | | 3 | 1 | 1 | 1 | Do. |
| 54 | ......do...... | 4-amino-2-methyl-5-methoxy-1,1'-azobenzene-4'-sulfonic acid. | (phenylene-COOH) | 2,4,6-trichloro-5-bromopyrimidine. | H | H | | 3 | 1 | 1 | 1 | Do. |
| 55 | ......do...... | ......do...... | (phenylene-SO₃H) | 2,4-dichloro-5-chloromethylpyrimidine. | H | H | | 3 | 1 | 1 | 1 | Do. |
| 56 | ......do...... | ......do...... | -CH₂-CH₂- | 2,4-dichloro-6-(2'-sulfoethylamino)-1,3,5-triazine. | H | H | | 3 | 1 | 1 | 1 | Do. |
| 57 | ......do...... | 4-amino-2-acetylamino-1,1'-azobenzene-4'-sulfonic acid. | 1,3-phenylene | Bromoacetyl chloride. | H | H | | 3 | 1 | 1 | 1 | Do. |
| 58 | ......do...... | ......do...... | ......do...... | 2,4,6-tribromo-5-carboxymethylpyrimidine. | H | H | | 3 | 1 | 1 | 1 | Do. |
| 59 | Copperphthalocyanine-3,3',3''. | 4-amino-2-sulfoacetylamino-1,1'-azobenzene-3'-sulfonic acid. | (phenylene-SO₃H) | 2,4-dibromo-5-bromomethyl-6-methylpyrimidine. | H | H | | 2 | 1 | 1 | 1 | Do. |

| Ex. No. | I | II | III | IV | V | VI | VII | VIII | IX | X | XI | XII |
|---|---|---|---|---|---|---|---|---|---|---|---|---|
| 60 | Copper-phthalo-cyanine-3,3′,3″,3‴. | 4-amino-2-sul-foacetyl-amino-1,1′-azobenzene-3′sulfonic acid. | (dichlorophenylene ring, Cl at two positions) | 2,4,6-tribromo-pyrimidine. | H | H | | 3 | 1 | 1 | 1 | Green. |
| 61 | ---do--- | 1-(4′-methyl-phenyl)-3-methyl-4-(4″-amino-phenylazo)-5-pyrazolone-2′,2″-disul-fonic acid. | 1,3-phenylene | 2,4,5,6-tetra-chloropyrim-idine. | H | H | | 3 | 1 | 1 | 1 | Do. |
| 62 | ---do--- | ---do--- | ---do--- | 2,4-dichloro-6-(3′-hydroxy-propyl-amino)-1,3,5-triazine. | H | H | | 3 | 1 | 1 | 1 | Do. |
| 63 | ---do--- | 1-(4′-methyl-phenyl)-3-methyl-4-(4″-amino-phenylazo)-5-pyrazolone-2′-sulfonic acid. | (phenylene-COOH) | 2,4,6-trichloro-5-carbethoxy-pyrimidine. | H | H | | 3 | 1 | 1 | 1 | Do. |
| 64 | ---do--- | 1-phenyl-3-methyl-phenylazo)-5-pyrazolone-2′,4′-disul-fonic acid. | (phenylene-COOH) | 2,4,6-trichloro-pyrimidine. | H | H | | 3 | 1 | 1 | 1 | Do. |
| 65 | ---do--- | 1-phenyl-3-methyl-4-(4″-amino-phenylazo)-5-pyrazolone-2′-4′-disul-fonic acid. | -CH₂-CH(CH₃)- | α-Bromo-acrylyl chloride. | H | H | | 3 | 1 | 1 | 1 | Do. |
| 66 | ---do--- | ---do--- | (phenylene with OCH₃ and Cl) | 2,4-dibromo-5-bromo-methyl-pyrimidine. | H | H | | 3 | 1 | 1 | 1 | Do. |
| 67 | ---do--- | ---do--- | (phenylene with OCH₃ and Cl) | 2,4-dichloro-6-di-(2′-hy-droxypro-pyl)-amino-1,3,5-triazine. | H | H | | 3 | 1 | 1 | 1 | Do. |
| 68 | Copper-phthalo-cyanine-4,4′,4″. | 1-phenyl-3-methyl-4-(3″-amino-phenylazo)-5-pyrazolone-2′,4′-disul-fonic acid. | (phenylene with CH₃O-) | 2,4-dibromo-6-(2′,5′-disul-fophenyl-amino)-1,3,5-triazine. | H | H | | 2 | 1 | 1 | 1 | Do. |
| 69 | ---do--- | 4-amino-3-car-boxy-1,1′-azobenzene-4′-sulfonic acid. | 1,4-phenylene | 2,4-dichloro-6-N-methyl-N-4′-sulfo-phenyl-amino-1,3,5-triazine. | H | H | | 2 | 1 | 1 | 1 | Do. |
| 70 | Copper-phthalo-cyanine-3,3′,3″,3‴. | ---do--- | (phenylene-CH₃) | 2,4,6-trichloro-5-ethylpy-rimidine. | H | H | | 3 | 1 | 1 | 1 | Do. |
| 71 | ---do--- | 4-amino-2,5-dimethyl-1,1′-azoben-zene-3′-sul-fonic acid. | (phenylene-CH₃) | 2,4,6-tribromo-5-carbome-thoxypyrim-idine. | H | H | | 3 | 1 | 1 | 1 | Do. |
| 72 | ---do--- | ---do--- | 1,3-phenylene | 2,4-dichloro-6-N-β-hy-droxyethyl-N-3′-sulfo-phenyl-amino-1,3,5-triazine. | H | H | | 3 | 1 | 1 | 1 | Do. |
| 73 | ---do--- | 1-(4′-chloro-phenyl)-3-methyl-4-(3″-amino-phenylazo)-5-pyrazolone-2′-sulfonic acid. | ---do--- | 2,4-dichloro-6-(2′-carboxy-ethylamino)-1,3,5-triazine. | H | H | | 3 | 1 | 1 | 1 | Do. |
| 74 | ---do--- | ---do--- | ---do--- | 2,4,6-tribromo-5-carboxypy-rimidine. | H | H | | 3 | 1 | 1 | 1 | Do. |
| 75 | ---do--- | ---do--- | ---do--- | Bromoacetyl chloride. | H | H | | 3 | 1 | 1 | 1 | Do. |

| Ex. No. | I | II | III | IV | V | VI | VII | VIII | IX | X | XI | XII |
|---|---|---|---|---|---|---|---|---|---|---|---|---|
| 76 | Copperphthalocyanine-3,3',3'',3'''. | 1-(4'-chlorophenyl)-3-methyl-4-(3''-aminophenylazo)-5-pyrazolone-2''sulfonic acid. | ⬡—COOH | 2,4,6-trichloropyrimidine. | H | H | | 3 | 1 | 1 | 1 | Green. |
| 77 | ___do___ | 1-(2'-chloro-6'-methylphenyl)-3-methyl-4-(4''-aminophenylazo)-5-pyrazolone-4',2'-disulfonic acid. | ⬡—OCH₃ | 2,4,5,6-tetrachloropyrimidine. | H | H | | 3 | 1 | 1 | 1 | Do. |
| 78 | ___do___ | ___do___ | 1,3-phenylene | 2,4,6-tribromo-5-carbethoxypyrimidine. | H | H | | 3 | 1 | 1 | 1 | Do. |
| 79 | ___do___ | 1-(2'-methylphenyl)-3-methyl-4-(3''-aminophenylazo)-5-pyrazolone-4''-sulfonic acid. | ⬡—SO₃H | 2,4-dichloro-5-chloromethylpyrimidine. | H | H | | 3 | 1 | 1 | 1 | Do. |
| 80 | ___do___ | ___do___ | —CH₂—CH₂— | β-Chloropropionyl. | H | H | | 3 | 1 | 1 | 1 | Do. |
| 81 | ___do___ | 1-phenyl-3-methyl-4-(3''-aminophenylazo)-5-pyrazolone-2',4'-disulfonic acid. | ⬡—CH₃ | 2,4-dichloro-6-methylamino-1,3,5-triazine. | H | H | | 3 | 1 | 1 | 1 | Do. |
| 82 | ___do___ | ___do___ | ⬡—CH₃ | 2,4,6-trichloropyrimidine. | H | H | | 3 | 1 | 1 | 1 | Do. |
| 83 | ___do___ | ___do___ | 1,3-phenylene | 2,4-dichloro-6-(2'-ethoxyethylamino)-1,3,5-triazine. | H | H | | 3 | 1 | 1 | 1 | Do. |
| 84 | ___do___ | 4-amino-2-propionylamino-1,1'-azobenzene-2',5'-disulfonic acid. | ___do___ | 2,4,5,6-tetrabromopyrimidine. | H | H | | 3 | 1 | 1 | 1 | Do. |
| 85 | ___do___ | ___do___ | ___do___ | 2,4-dichloro-6-(2'-carboxyphenylamino)1,3,5-triazine. | H | C₂H₅ | | 3 | 1 | 1 | 1 | Do. |
| 86 | ___do___ | ___do___ | ___do___ | β-Chloropropionyl chloride. | H | H | | 3 | 1 | 1 | 1 | Do. |
| 87 | Copperphthalocyanine-4,4'-4''-4'''. | 4-amino-3-methoxy-1,1'-azobenzene-4'-sulfonic acid. | ⬡—Cl | 2,4,6-trichloropyrimidine. | H | H | | 3 | 1 | 1 | 1 | Do. |
| 88 | ___do___ | ___do___ | 1,4-phenylene | 2,4-dichloro-6-(2',5'-disulfophenylamino)-1,3,5-triazine. | H | H | —NH—C₂H₅ | 2 | 2 | 1 | 1 | Do. |
| 89 | ___do___ | 4-amino-2-methylsulfonylamino-1,1'-azobenzene-3'-sulfonic acid. | ___do___ | α-Chloroacrylyl chloride. | H | H | —NH—C₂H₄OH | 2 | 2 | 1 | 1 | Do. |
| 90 | Copperphthalocyanine-3,3',3'',3'''. | ___do___ | 1,3-phenylene | 2,4,6-trichloro-4-carboxymethylpyrimidine. | H | H | —NH—CH₃ | 2 | 2 | 1 | 1 | Do. |
| 91 | ___do___ | 4-amino-2'-chloro-1,1'-azobenzene-4'-sulfonic acid. | ___do___ | 2,4,5,6-tetrachloropyrimidine. | H | H | | 3 | 1 | 1 | 1 | Do. |
| 92 | ___do___ | 4-amino-2'-methyl-1,1'-azobenzene-4'-sulfonic acid. | ___do___ | ___do___ | H | H | | 3 | 1 | 1 | 1 | Do. |
| 93 | ___do___ | 4-amino-2'-methoxy-1,1'-azobenzene-4'-sulfonic acid. | ___do___ | ___do___ | H | H | | 3 | 1 | 1 | 1 | Do. |
| 94 | ___do___ | 4-amino-2',4'-dimethyl-1,1'-azobenzene-6'-sulfonic acid. | ⬡—SO₃H | 2,4-dichloro-5-chloromethylpyrimidine. | H | H | | 3 | 1 | 1 | 1 | Do. |
| 95 | ___do___ | 4-methylamino-2-methyl-1,1'-azobenzene-2',5'-disulfonic acid. | ⬡—SO₃H | 2,4,6-trichloropyrimidine. | CH₃ | H | | 3 | 1 | 1 | 1 | Do. |
| 96 | ___do___ | ___do___ | 1,3-phenylene | ___do___ | C₂H₅ | H | | 3 | 1 | 1 | 1 | Do. |

| Ex. No. | I | II | III | IV | V | VI | VII | VIII | IX | X | XI | XII |
|---|---|---|---|---|---|---|---|---|---|---|---|---|
| 97 | Copper-phthalo-cyanine-3,3',3'',3'''. | 4-ethylamino-1,1'-azobenzene-2',5'-disulfonic acid. | 1,3-phenylene | 2,4,5,6-trichloro-pyrimidine. | H | H | | 3 | 1 | 1 | 1 | Green. |
| 98 | do | 4-amino-1,1'-azobenzene-2',5'-disulfonic acid. | do | do | CH$_3$ | H | | 3 | 1 | 1 | 1 | Do. |
| 99 | do | do | do | do | H | CH$_3$ | | 3 | 1 | 1 | 1 | Do. |
| 100 | do | do | do | do | H | H | -NH-C$_2$H$_4$OH | 2 | 2 | 1 | 1 | Do. |
| 101 | do | do | do | do | H | H | -N(C$_2$H$_4$OH) | 2 | 2 | 1 | 1 | Do. |
| 102 | do | do | do | do | H | H | -N(CH$_3$)$_2$ | 2 | 2 | 1 | 1 | Do. |
| 103 | do | do | -CH$_2$-CH$_2$- | do | H | C$_2$H$_5$ | | 3 | 1 | 1 | 1 | Do. |
| 104 | do | do | 1,3-phenylene | 2,4-dichloro-6-(2'-sulfo-ethylamino)-1,3,3-triazine. | H | H | -N(C$_2$H$_5$)$_2$ | 2 | 2 | 1 | 1 | Do. |
| 105 | do | do | 1,4-phenylene | 2,4-dichloro-6-dimethyl-amino-1,3,5-triazine. | H | H | | 3 | 1 | 1 | 1 | Do. |
| 106 | do | do | do | 2,4,6-trichloro-pyrimidine. | H | H | | 2 | 1 | 2 | 1 | Do. |
| 107 | do | do | do | do | H | H | | 2 | 1 | 1 | 2 | Yellowish green. |
| 108 | do | do | do | do | H | H | -NH-C$_2$H$_5$ | 2 | 2 | 1 | 1 | Green. |
| 109 | do | 4-amino-1,1'-azobenzene-2',4'-disulfonic acid. | 1,3-phenylene | do | H | C$_2$H$_5$-OH | | 3 | 1 | 1 | 1 | Do. |
| 110 | do | do | do | do | H | H | NH$_2$ | 2 | 2 | 1 | 1 | Do. |
| 111 | do | 4-(β-hydroxy-ethylamino)-1,1'-azobenzene-4'-sulfonic acid. | do | do | H | H | | 3 | 1 | 1 | 1 | Do. |

Formulae of representative dyes of the foregoing examples are as follows:

Example 1

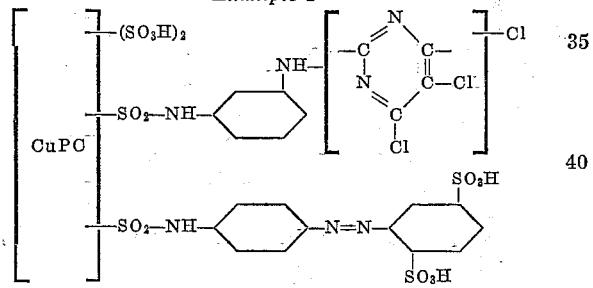

the four substituents being in the positions 3, 3', 3" and 3'''.

Example 2

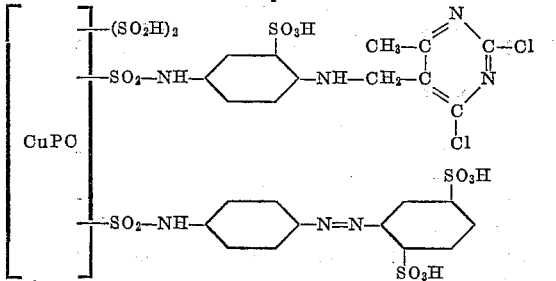

the four substituents being in the positions 4, 4', 4" and 4'''.

Example 3
[First paragraph]

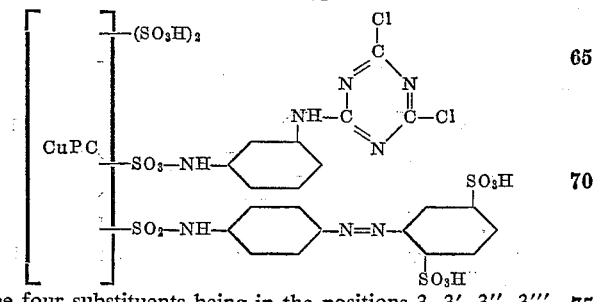

the four substituents being in the positions 3, 3', 3", 3'''.

Example 3
[Second paragraph]

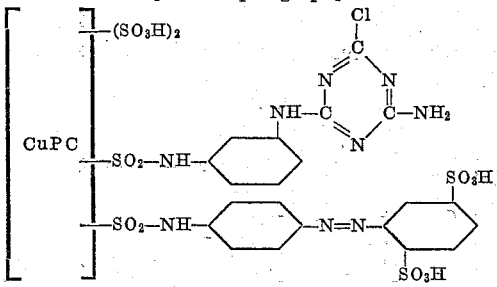

the four substituents being in the positions 3, 3', 3", 3'''.

Example 4

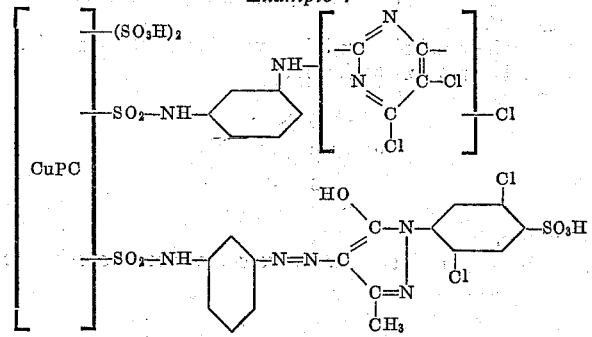

the four substituents being in the positions 3, 3', 3" and 3'''.

Example 5

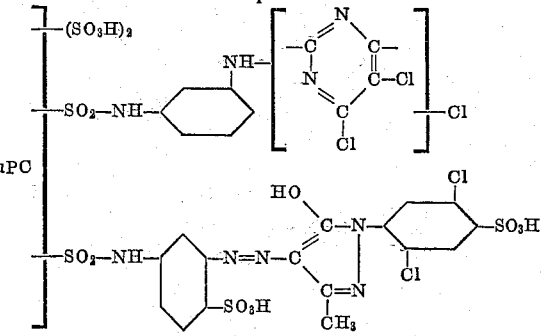

the four substituents being in the positions 3, 3′, 3″ and 3‴.

*Example 5*

[Last paragraph]

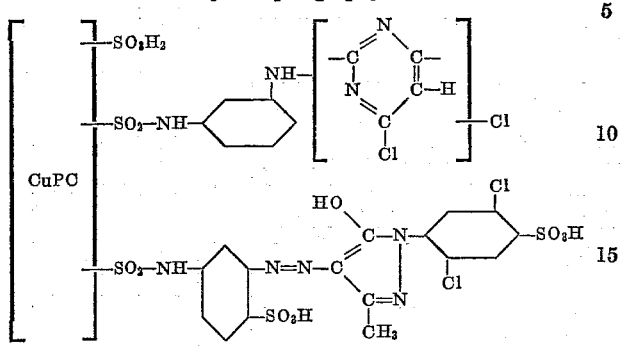

the four substituents being in the positions 3, 3′, 3″ and 3‴.

*Example 6*

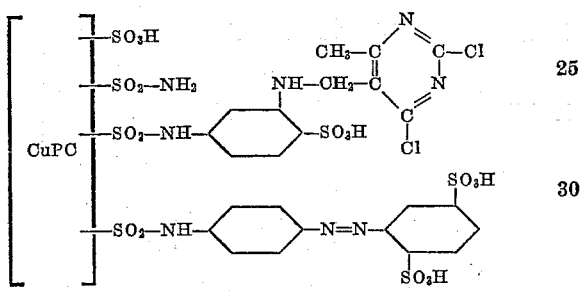

the four substituents being in the positions 3, 3′, 3″ and 3‴.

*Example 7*

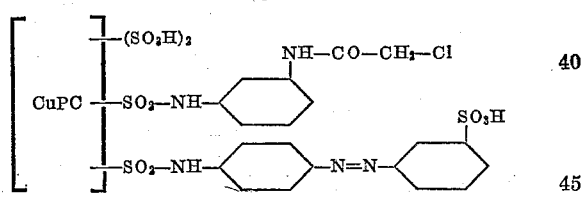

the four substituents being in the positions 3, 3′, 3″ and 3‴.

Having thus disclosed the invention what I claim is:

1. Dyestuff of the formula

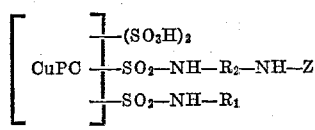

wherein $R_1$ is a member selected from the group consisting of the radicals

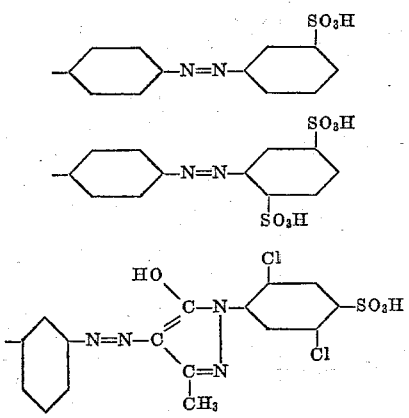

and

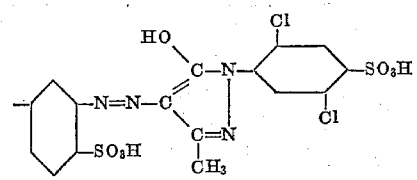

$R_2$ is a member selected from the group consisting of 1,3-phenylene, 4-sulfo-1,3-phenylene and 3-sulfo-1,4-phenylene, and Z is a member selected from the group consisting of chloracetyl, 4,6-dichloro-1,3,5-triazinyl-2, 4-amino-6-chloro-1,3,5-triazinyl-2, 2,4-dichloro-6-methyl-pyrimidyl-5-methylene,

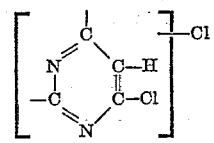

and

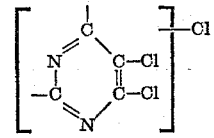

2. The dyestuff of the formula

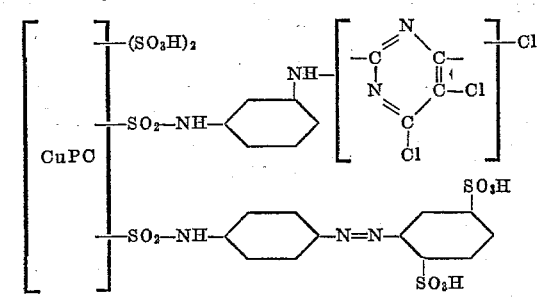

the four substituents being in the positions 3, 3′, 3″ and 3‴.

3. The dyestuff of the formula

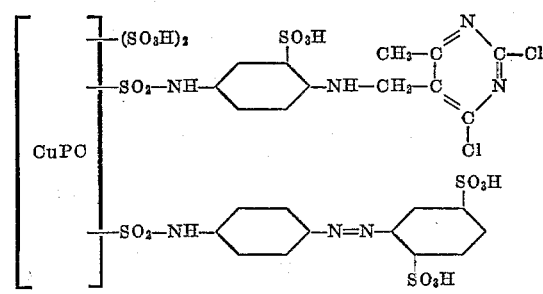

the four substituents being in the positions 4, 4′, 4″ and 4‴.

4. The dyestuff of the formula

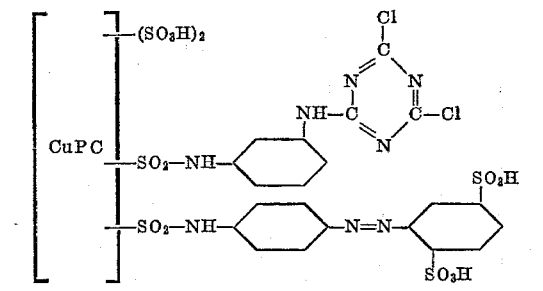

the four substituents being in the positions 3, 3′, 3″, 3‴.

5. The dyestuff of the formula

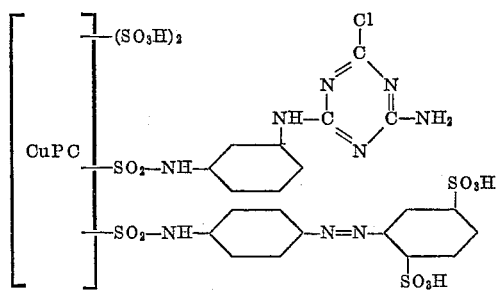

the four substituents being in the positions 3, 3', 3" and 3'''.

6. The dyestuff of the formula

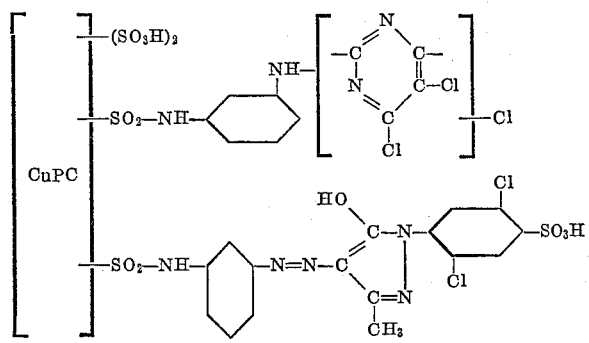

the four substituents being in the positions 3, 3', 3" and 3'''.

7. The dyestuff of the formula

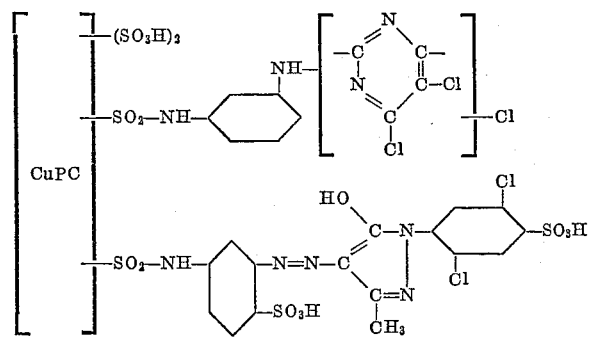

the four substituents being in the positions 3, 3', 3" and 3'''.

8. The dyestuff of the formula

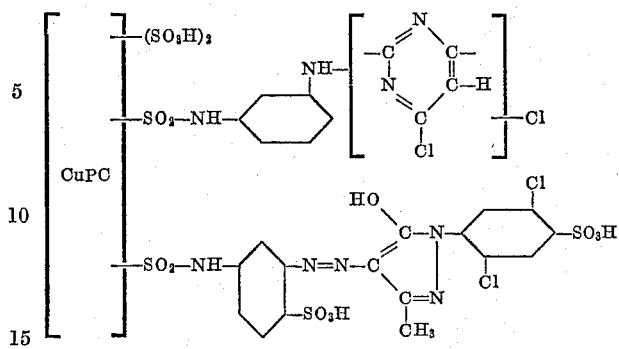

the four substituents being in the positions 3, 3', 3" and 3'''.

9. The dyestuff of the formula

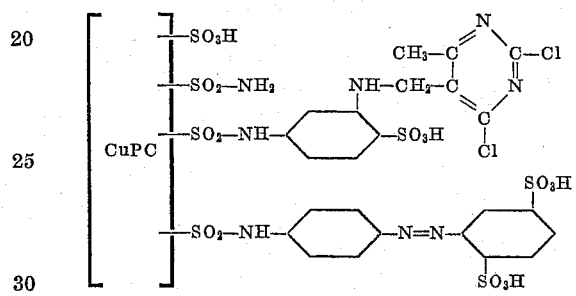

the four substituents being in the positions 3, 3', 3''' and 3'''.

10. The dyestuff of the formula

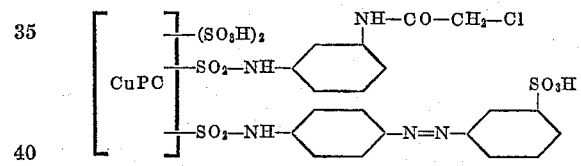

the four substituents being in the positions 3, 3', 3" and 3'''.

References Cited in the file of this patent
UNITED STATES PATENTS
3,082,201    Koller _____ Mar. 19, 1963
FOREIGN PATENTS
1,221,621    France _____ Jan. 18, 1960

UNITED STATES PATENT OFFICE
CERTIFICATE OF CORRECTION

Patent No. 3,133,050　　　　　　　　　　　　　　May 12, 1964

Hans von Tobel

It is hereby certified that error appears in the above numbered patent requiring correction and that the said Letters Patent should read as corrected below.

Column 5, line 34, for "-ethylamine-" read -- -ethylamino- --; columns 11 and 12, in the table, under the heading "III", and opposite Ex. No. 17, the formula should appear as shown below instead of as in the patent:

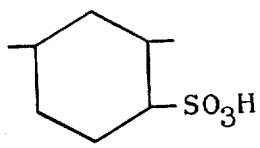

same table, under the heading "IV", and opposite Ex. No. 11, for "β-chloropionylchloride" read -- β-chloropropionylchloride --; columns 13 and 14, in the table, under the heading "I", and opposite Ex. No. 21, for "phthalocyanie" read -- phthalocyanine --; same table, under the heading "IV", and opposite Ex. No. 32, for "β-Bromopropionly" read -- β-Bromopropionyl --; same table, under the heading "IV", and opposite Ex. No. 39, for "-triaozine-" read -- -triazine- --; columns 17 and 18, in the table, under the heading "II", and opposite Ex. No. 60, for "azobenzine-3' sulfonic acid" read -- azobenzene-3'-sulfonic acid --; columns 21 and 22, in the table, under the heading "IV", and opposite Ex. No. 104, for "1,3,3-triazine" read -- 1,3,5-triazine --; column 23, the first formula under "Example 5", for the upper left-hand portion of the formula reading "-$SO_3H_2$" read -- -$(SO_3H)_2$ --.

Signed and sealed this 22nd day of December 1964.

(SEAL)
Attest:

ERNEST W. SWIDER　　　　　　　　　　　　　EDWARD J. BRENNER
Attesting Officer　　　　　　　　　　　　　Commissioner of Patents